United States Patent
Tao et al.

(10) Patent No.: US 12,554,013 B2
(45) Date of Patent: Feb. 17, 2026

(54) AUTOMATIC OBSTACLE AVOIDANCE METHOD, ELECTRONIC DEVICE, AND UNMANNED AERIAL VEHICLE

(71) Applicant: AUTEL ROBOTICS CO., LTD., Shenzhen (CN)

(72) Inventors: Feng Tao, Shenzhen (CN); Yanfeng Dang, Shenzhen (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 289 days.

(21) Appl. No.: 18/215,649

(22) Filed: Jun. 28, 2023

(65) Prior Publication Data

US 2024/0004060 A1 Jan. 4, 2024

(51) Int. Cl.
*G01S 13/935* (2020.01)
*G01S 13/88* (2006.01)
*G05D 1/00* (2006.01)
*G05D 1/242* (2024.01)
*G05D 109/25* (2024.01)

(52) U.S. Cl.
CPC .......... *G01S 13/935* (2020.01); *G01S 13/882* (2013.01); *G05D 1/106* (2019.05); *G05D 1/242* (2024.01); *G05D 2109/254* (2024.01)

(58) Field of Classification Search
None
See application file for complete search history.

(56) References Cited

U.S. PATENT DOCUMENTS 9,110,170 B1 * 8/2015 Woollard ................. G01S 13/89
9,387,938 B1 * 7/2016 Vanderkamp ............ G01S 7/22
2017/0010350 A1   1/2017 Winstead
2018/0134372 A1 * 5/2018 Kanistras ................ B64C 21/04
2020/0110425 A1 * 4/2020 Wang ....................... G08G 5/74

FOREIGN PATENT DOCUMENTS

CN    110178046 A * 8/2019 ........... G01S 13/935
CN    111638514 A    9/2020
CN    112985456 A    6/2021

OTHER PUBLICATIONS

Lindsey, T. S., 2014. "On the Kalman Filter and Its Variations" (Order No. 1559665). Available from ProQuest Dissertations and Theses Professional. (Year: 2014).*
Search report of EP23182802.1 dated Nov. 22, 2023, 10 pages.

* cited by examiner

*Primary Examiner* — Vladimir Magloire
*Assistant Examiner* — Ashley Brown Raynal
(74) *Attorney, Agent, or Firm* — Arch & Lake LLP; Hao Tan; Hao Li

(57) ABSTRACT

An automatic obstacle avoidance method is applied to an unmanned aerial vehicle (UAV). The UAV includes at least one radar. The method includes: acquiring detected data of the radar; calculating theoretical state information of the detection target based on motion information of the UAV; excluding invalid data from the detected data using a Kalman filtering algorithm to obtain corrected data by combining the detected data with the theoretical state information; determining the height information of the UAV by correcting the detected data; and triggering an obstacle avoidance warning when the height information of the UAV is less than a pre-set height threshold value.

18 Claims, 11 Drawing Sheets

AUTOMATIC OBSTACLE AVOIDANCE METHOD, ELECTRONIC DEVICE, AND UNMANNED AERIAL VEHICLE

CROSS-REFERENCE TO RELATED APPLICATION

This application claims priority of Chinese Patent Application No. 202210775585.9, filed on Jul. 1, 2022 and entitled "altitude information correction method, automatic obstacle avoidance method, and apparatus thereof, electronic device and unmanned aerial vehicle," the entire disclosure of which is incorporated herein by reference for all purposes.

BACKGROUND

With the continuous development of technology, various types of vehicle equipment, such as unmanned aerial vehicles, have become widely available in people's daily life, and can be used in many different fields of aerial travel, express transportation, disaster relief, etc.

Therefore, how to ensure the safe flight of an unmanned aerial vehicle is an important issue cared for by human beings. For unmanned aircraft such as unmanned aerial vehicles, acquiring accurate external environment information is the premise of their safe flight. In particular, the real-time altitude information of the unmanned aerial vehicle plays an important role in obstacle avoidance and takeoff and landing control.

Conventional height detection methods may include a plurality of the following methods: 1) altimetry based on GPS: i.e., the unmanned height is measured according to the orientation of the GPS satellite: 2) altimetry based on barometer: that is, the atmospheric pressure is measured to transform to the current height information: 3) altimetry based on the ultrasonic radar: i.e., by sending ultrasonic waves to the ground, calculating an echo time to transform to obtain height information with the ground.

However, the above-mentioned conventional methods all have many defects, for example, the GPS altimetry method needs to take the takeoff point of the unmanned aerial vehicle as the initial height for calibration, which can only output the height difference of the current position of the unmanned aerial vehicle relative to the takeoff point. Therefore, in an uneven ground area, accurate height information cannot be provided. In addition, if low-cost GPS is used for altimetry, its low refresh rate will lead to the risk of unmanned aerial vehicle safety accidents. The way of barometric altimetry is susceptible to climate change, such as changes in airflow, which introduces measurement errors. The altimetry based on ultrasonic radar can only be used in low altitude because of the characteristics of ultrasonic, and the measurement range is usually less than 10 m, which is difficult to meet the actual needs of unmanned aerial vehicles.

SUMMARY

Embodiments of the present disclosure relate to the technical field of radar data processing technology, in particular to an automatic obstacle avoidance method, an electronic device and an unmanned aerial vehicle, capable of overcoming at least some of the defects of existing height detection methods.

According to a first aspect, embodiments of the present disclosure provide an automatic obstacle avoidance method for a carrier. The method comprises: acquiring detected data of a radar; the detected data comprising: observation state information of a detection target; calculating theoretical state information of the detection target based on motion information of the carrier; the radar being carried on the carrier; excluding invalid data from the detected data using a Kalman filtering algorithm to obtain corrected data by combining the detected data with the theoretical state information; and determining the height information of the carrier according to the corrected data; and triggering an obstacle avoidance warning when the height information of the carrier is less than a pre-set height threshold value.

According to a second aspect, embodiments of the present disclosure provide an electronic device. The electronic device comprises at least one processor and a memory communicatively coupled to the at least one processor; wherein the memory stores instructions executable by the at least one processor to enable the at least one processor to perform the automatic obstacle avoidance method described above.

According to a third aspect, embodiments of the present disclosure provide an unmanned aerial vehicle. The unmanned aerial vehicle comprises a vehicle body; a radar being provided at the bottom of the vehicle body proximate to the ground; a vehicle arm coupled to the vehicle body; a power drive unit provided on the vehicle arm for providing flying power to the unmanned aerial vehicle; and a flight controller provided on the vehicle body and communicatively coupled to the radar; wherein the flight controller is configured to perform the automatic obstacle avoidance method described above.

One of the advantageous aspects of the height information correction method according to an embodiment of the present disclosure is that: by combining the two sets of theoretical state data and observation state data from different measurement systems, the Kalman filtering algorithm can effectively eliminate the invalid data corresponding to the objects with smaller volume in the original radar data, thus avoiding the high mutation caused by these data information and the interference of false objects caused by external noise.

Another advantageous aspect of the height information correction method according to an embodiment of the present disclosure is that: by searching and filtering the detection target data proximate to the tilt angle of the radar and combining with the historical data, the limitation that the normal direction of the radar should be perpendicular to the ground is broken when detecting the height from the ground, which can effectively improve the practicality.

BRIEF DESCRIPTION OF THE DRAWINGS

One or more embodiments are illustrated by way of example and not by way of limitation in the Figs. of the accompanying drawings, in which elements having the same reference numeral designations represent similar elements, and in which the Figs. are not to scale unless otherwise specified.

DETAILED DESCRIPTION

Figure 1:
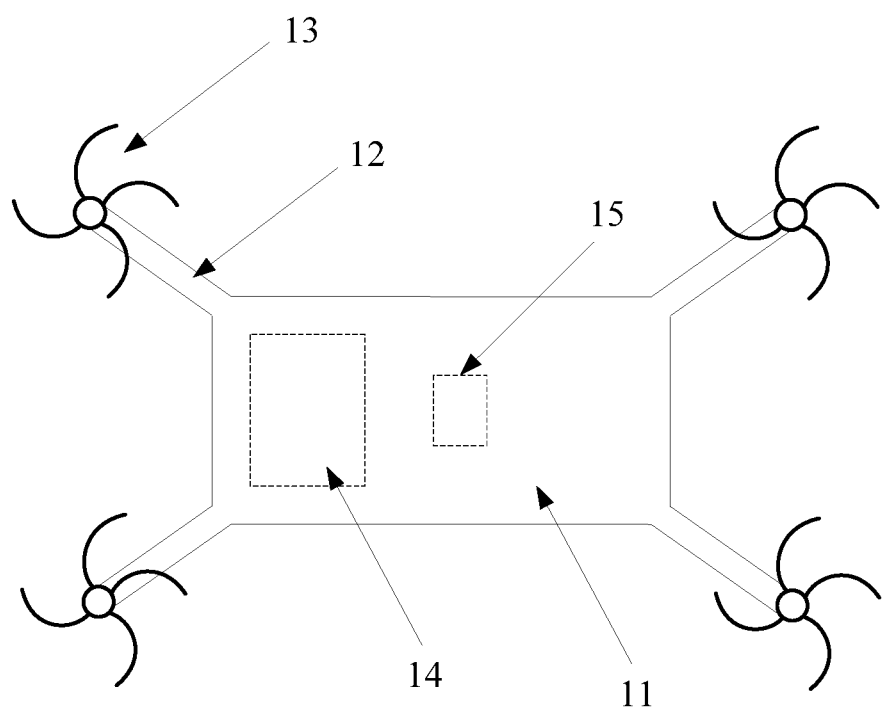
FIG. 1 is a schematic diagram of an application environment according to an embodiment of the present disclosure.

In order that the disclosure may be readily understood, a more particular description of the disclosure will be rendered by reference to the appended drawings and detailed description. It will be understood that when an element is referred to as being "secured" to another element, it can be directly on the other element or intervening elements may be present. When an element is referred to as being "connected" to another element, it can be directly connected to the other element or intervening elements may be present. As used in this specification, the terms "upper", "lower", "inner", "outer", "bottom", and the like indicate orientations or positional relations based on the orientation or positional relations shown in the figures are merely for convenience in describing and simplifying the present disclosure, and do not indicate or imply that the device or element being referred to must have a particular orientation, be constructed and operated in a particular orientation, and not to be construed as limiting the disclosure. Further, the terms "first", "second", "third", and the like are used for descriptive purposes only and are not to be construed as indicating or implying relative importance.

Unless defined otherwise, all technical and scientific terms used in the description have the same meaning as commonly understood by a person skilled in the art to which this disclosure belongs. The terminology used in the description of the disclosure herein is for the purpose of describing particular embodiments only and is not intended to be limiting to the disclosure. As used herein, the term "and/or" includes any and all combinations of one or more of the associated listed items.

Further, the features of the various embodiments of the present disclosure described below can be combined as long as they do not conflict with each other.

"Millimeter wave radar" refers to a sounding radar operating in the millimeter wave band. It has an extremely high refresh rate, enabling real-time reporting of the current ground level at refresh frequencies on the order of milliseconds. In addition, it is detected based on electromagnetic waves and is not interfered by harsh environments such as heavy fog and sandstorm. The millimeter-wave radar determines information such as a distance, a relative angle, and a relative speed between the millimeter-wave radar and an obstacle based on analysis of the received intermediate frequency signal.

Generally, the unmanned aerial vehicle cannot recognize and eliminate the interference of the foreign matters, such as cars, trees or wires, which cause highly abrupt changes, or false foreign matters due to unknown external noise, when the foreign matters appear below the flight path of the unmanned aerial vehicle. The controller can only respond to highly abrupt information, make corresponding adjustments to the flight posture of the unmanned aerial vehicle or trigger obstacle avoidance warning operation. In addition, the antenna normal direction of the millimeter wave radar needs to be perpendicular to the ground to acquire accurate height information. In this way, the unmanned aerial vehicle equipped with millimeter-wave radar to detect the height above ground limited.

The applicant found that: on the one hand, based on the idea of Kalman filtering, after weighting and superimposing of the radar data obtained by millimeter wave radar and other relatively independent data systems (for example, the theoretical data obtained by calculating based on the flight motion state of an unmanned aerial vehicle), more accurate data information can be better selected to effectively eliminate the interference of foreign matters (for example, some small non-ground targets) and filter out invalid data, so that an unmanned aerial vehicle and other similar vehicles do not need to make unnecessary avoidance actions or trigger unnecessary obstacle avoidance warnings. On the other hand, based on the geometric relation of three-dimensional space, the corresponding height adjustment calculation method can obtain accurate height information when the millimeter wave radar is inclined. In addition, in the case where the millimeter wave radar cannot provide reliable data, the altitude information can also be derived from the motion information of the carrier (e.g., an unmanned aerial vehicle) and previously calculated historical altitude data.

FIG. 1 is a schematic diagram of an application environment according to an embodiment of the present disclosure. The unmanned aerial vehicle (UAV) 10 is taken as an example of the application environment. As shown in FIG. 1, the unmanned aerial vehicle 10 comprises a vehicle body 11, a vehicle arm 12, a power drive unit 13 and a flight controller 14.

The airframe 11 is a main structure of the unmanned aerial vehicle 10. It has a suitable volume and shape to meet the needs of the actual situation for providing sufficient space to accommodate one or more functional modules and components. For example, the vehicle body 11 may be provided with a variety of different sensor devices, such as millimeter wave radar. Specifically, the millimeter wave radar 15 may be fixed to the abdomen of the vehicle body 11. The abdomen of the vehicle body 11 refers to a side of the vehicle body 11 that is proximate to and facing the ground in normal use.

The vehicle arm 12 is a portion extending outward from the vehicle body 11 and serves as a mounting or fixing structure for the power drive unit 13 of the unmanned aerial vehicle 10 such as a propeller. The vehicle arm 12 may be integrally formed with the vehicle body 11 or may be detachably connected to the vehicle body 11. Typically, on a four-axis unmanned aerial vehicle, four numbers of vehicle arms 12 may be arranged extending symmetrically along a diagonal and forming four propeller mounting locations.

The power drive unit 13 is a structural device for providing flying power to the unmanned aerial vehicle 10. In some embodiments of the present disclosure, any suitable type of power and structural design may be employed. For example, a propeller driven by a motor and respectively mounted at a mounting position fixed at the end of the vehicle arm 12.

The flight controller 14 is a control core of the unmanned aerial vehicle 10 built into the vehicle body 11. It may be any type of electronic device with suitable logic judgment and computing capabilities, including, but not limited to, processor chips implemented on large-scale integrated circuits, integrated systems-on-a-chip (SOC), and processors and storage media connected by a bus. Based on the functions to be implemented (e.g., to perform the joint calibration method provided by embodiments of the present disclosure), the flight controller 14 may include a plurality of different functional modules, which may be software modules, hardware modules, or a modular arrangement of software and hardware to implement one or more functions.

Embodiments of the present disclosure show an application scenario of a radar data screening method and a height information correction method based on the screening method in an unmanned aerial vehicle for simplicity and example of presentation. However, the data screening and height detection methods provided by embodiments of the present disclosure can also be applied to other vehicle altimetry scenarios based on similar principles. The inventive concepts disclosed in the embodiments of the present disclosure are not limited to application on an unmanned aerial vehicle as shown in FIG. 1, but may also be used in other similar vehicles.

In order to fully explain the specific application process of the radar data screening and height information correction method provided in an embodiment of the present disclosure in the application scenario shown in FIG. 1, the principle of how to perform radar data screening based on Kalman filtering and exclude invalid data is described in detail below combined with FIGS. 2A to 2C.

Figure 2A:
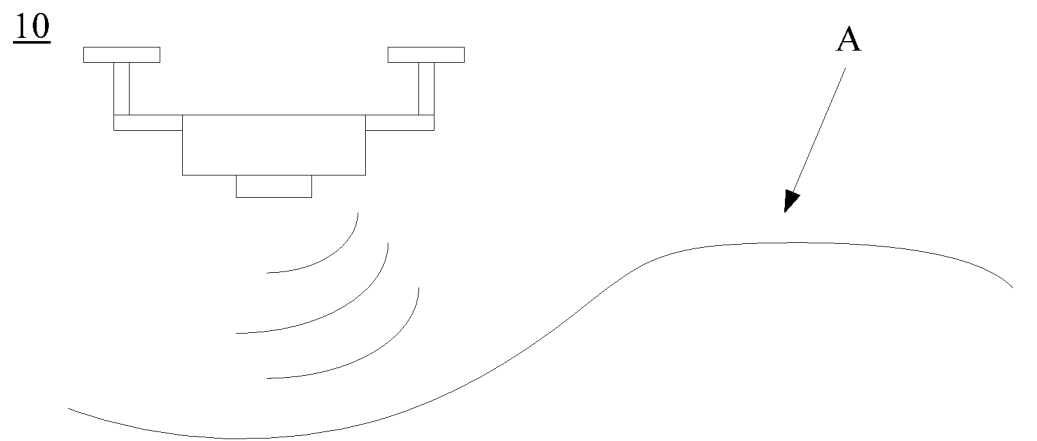
FIG. 2A is a schematic diagram of a millimeter-wave radar for detecting different types of targets of detection, illustrating ground and non-ground targets according to an embodiment of the present disclosure.
Figure 2A:
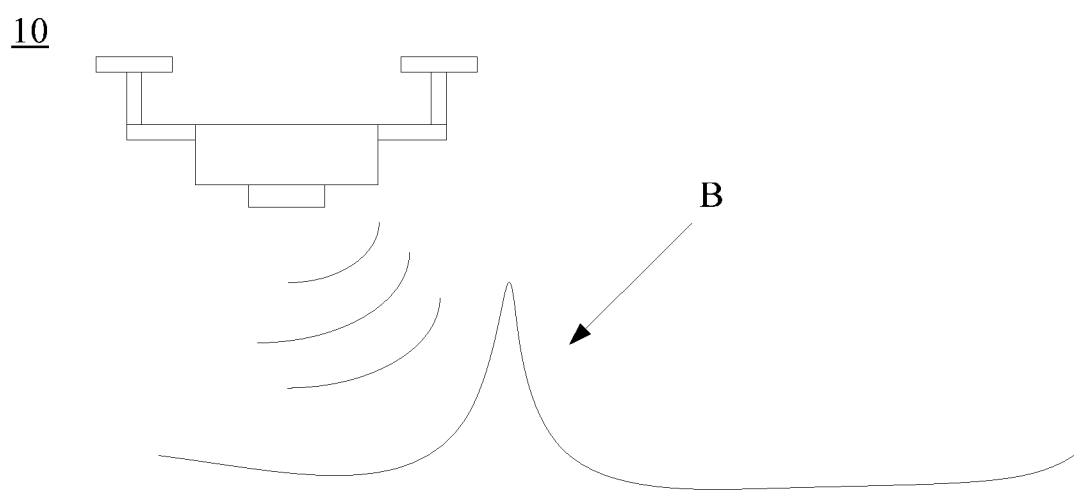

1) As shown in FIG. 2A, during the flight of the unmanned aerial vehicle 10 equipped with a millimeter wave radar, it will detect the environment under the unmanned aerial vehicle 10 at a certain refresh frequency, and feedback point cloud data containing one or more targets of detection. In some embodiments, point cloud data that has not been processed by the Kalman filtering algorithm may also be referred to as "detected data" and point cloud data that has been processed by the Kalman filtering algorithm may be referred to as "corrected data".

The flight controller 14 of the unmanned aerial vehicle 10 monitors the distance between the unmanned aerial vehicle 10 and each detection target based on the point cloud data provided by the millimeter wave radar to monitor whether it is too low above the ground. In the event that it is too low above the ground, the flight controller considers that there is a risk of a ground collision. To ensure flight safety, emergency measures such as obstacle avoidance warning, climbing or changing the course are usually issued accordingly to avoid accidents.

In some embodiments, among the point cloud data provided by the millimeter wave radar, there may be some detected objects called "non-ground targets", for example, electric towers, electric wires, cars, etc. These non-ground targets do not actually interfere with the flight of the unmanned aerial vehicle, but the flight controller usually wrongly determines that it is too low above the ground due to the close distance between the unmanned aerial vehicle and these non-ground targets, and triggers corresponding emergency measures.

The applicant has found that these non-ground targets generally have a small volume relative to the ground, the difference between which can be defined as: whether the unmanned aerial vehicle can pass through quickly or the unmanned aerial vehicle stay on the target. For example, as shown in FIG. 2A, when the volume of the detection target A is large, the residence time of the unmanned aerial vehicle above it is greater than 3 s or other time threshold, the landing plane on which the unmanned aerial vehicle lands can be provided due to its large volume, and thus can be regarded as "ground". However, when the volume of the detection target B is small and the residence time above it is short (or the elapsed time is short), for example, less than 3 s or another time threshold, it cannot be regarded as the landing plane of the unmanned aerial vehicle, and cannot be regarded as "ground", but a non-ground target. Thus, by combining the motion information of the unmanned aerial vehicle with the observation information of millimeter-wave radar, the invalid data representing non-ground targets can be excluded from the detected data, and the non-ground targets can be filtered out and the false trigger of automatic obstacle avoidance can be avoided.

Figure 2B:
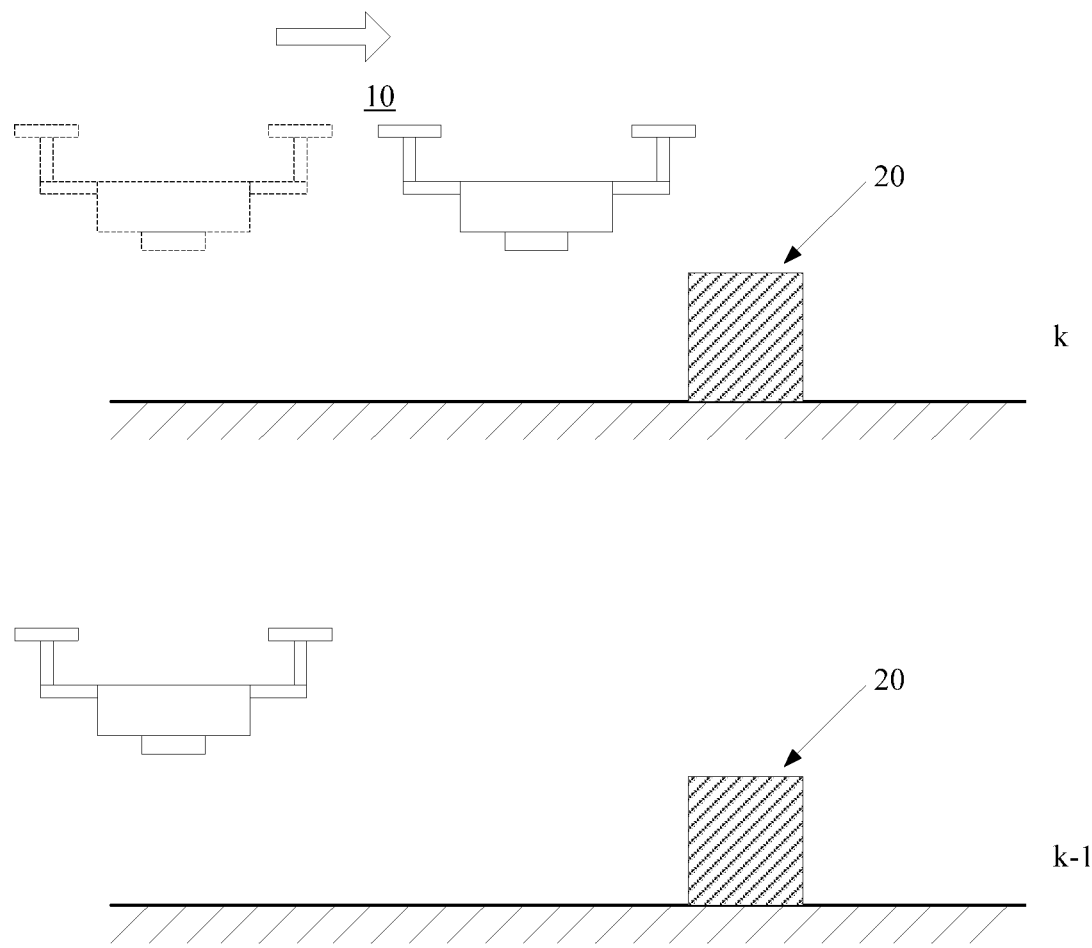
FIG. 2B is a schematic diagram of a change in height information detected data of an unmanned aerial vehicle according to an embodiment of the present, illustrating the movement of the unmanned aerial vehicle from time k−1 to time k.

2.1) As shown in FIG. 2B, in the system composed of the unmanned aerial vehicle 10 and the detection target 20, the state of the detection target 20 at any time can be described by the state vector shown in the following formula (1-1).

$$S(k)=[x(k)y(k)z(k)\dot{x}(k)\dot{y}(k)\dot{z}(k)\ddot{x}(k)\ddot{y}(k)\ddot{z}(k)]^T \quad (1\text{-}1)$$

wherein x(k), y(k), and z(k) are respectively three-dimensional coordinates of the detection target in a Cartesian coordinate system, the first derivatives $\dot{x}(k)$, $\dot{y}(k)$, and $\dot{z}(k)$ are respectively the velocities of the detection target on three coordinate axes, and the second derivatives $\ddot{x}(k)$, $\ddot{y}(k)$, and $\ddot{z}(k)$ are respectively the accelerations of the detection target on the three coordinate axes.

2.2) Based on the acceleration model, a state conversion formula describing the state change pattern of the detection target is established. In other words, when the state vector of the detection target at a previous time is known, the state vector at the current time of the detection target can be obtained through the state conversion formula. The state conversion formula can be expressed by the following formulas (1-2):

$$S(k)=FS(k-1)+W(k) \quad (1\text{-}2)$$

wherein S(k) is a state vector of the detection target at the current moment, S(k−1) is a state vector of the detection target at a previous moment, F is a state transform matrix, and W(k) is a control variable of the unmanned aerial vehicle.

The control variable represents the acceleration, deceleration, or other similar influence on the motion of the unmanned aerial vehicle due to the control command issued by the flight controller to the driving device (such as a motor). In some alternative embodiments, when the millimeter-wave radar is mounted on another carrier that changes a motion state without generating the above-described control command, the control variable may be omitted.

Specifically, the above state transform matrix is represented by the following formulas (1-3):

$$F = \begin{bmatrix} 1 & 0 & 0 & T & 0 & 0 & 0.5T^2 & 0 & 0 \\ 0 & 1 & 0 & 0 & T & 0 & 0 & 0.5T^2 & 0 \\ 0 & 0 & 1 & 0 & 0 & T & 0 & 0 & 0.5T^2 \\ 0 & 0 & 0 & 1 & 0 & 0 & T & 0 & 0 \\ 0 & 0 & 0 & 0 & 1 & 0 & 0 & T & 0 \\ 0 & 0 & 0 & 0 & 0 & 1 & 0 & 0 & T \\ 0 & 0 & 0 & 0 & 0 & 0 & 1 & 0 & 0 \\ 0 & 0 & 0 & 0 & 0 & 0 & 0 & 1 & 0 \\ 0 & 0 & 0 & 0 & 0 & 0 & 0 & 0 & 1 \end{bmatrix} \quad (1\text{-}3)$$

3) in the system composed of the unmanned aerial vehicle 10 and the detection target 20, in addition to the state information of the detection target 20 that can be obtained based on the motion state of the unmanned aerial vehicle, the millimeter wave radar of the unmanned aerial vehicle 10 can also provide detected data related to the detection target 20.

According to the embodiment, the detected data for describing the state of the detection target 20 may be represented by a detection vector of the following formula (2-1).

$$u(k) = [r(k) \varphi(k) \theta(k) \dot{r}(k)]^T \quad (2\text{-}1)$$

Wherein u(k) is a current detection vector of the millimeter wave radar, r(k) is a distance between the millimeter wave radar and the detection target, $\varphi(k)$ is a direction angle of the detection target with respect to the millimeter wave radar, $\theta(k)$ is a pitch angle of the detection target with respect to the millimeter wave radar, and the first derivative $\dot{r}(k)$ is the radial velocity of the detection target with respect to the millimeter wave radar.

Figure 2C:
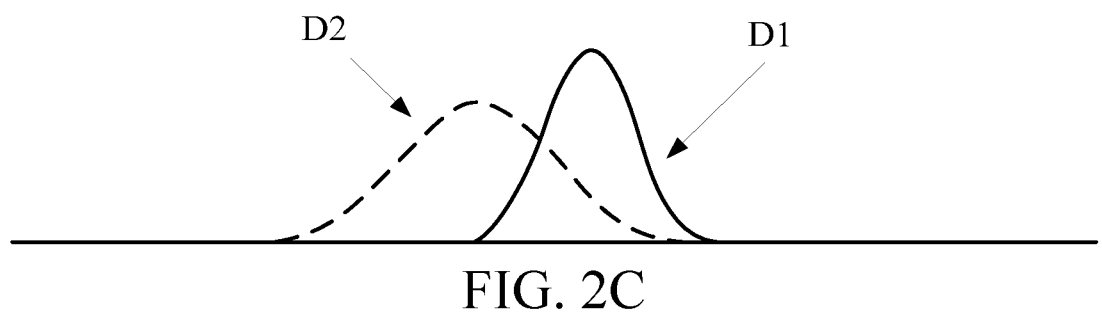
FIG. 2C is a schematic diagram of a weighting and superimposing of two sets of independent data sources according to an embodiment of the present, illustrating the relation of the weighting and superimposing between theoretical state information and observation state information.

4.1 As shown in FIG. 2C, the detection vector, and the state vector have different sources and are two relatively independent data. Thus, the observed data D1 from the millimeter wave radar and the theoretical state data D2 of the detection target calculated based on the motion state of the unmanned aerial vehicle can be weighted and superimposed by means of Kalman filtering processing to help to select the accurate data of the detection target, thereby achieving the effects of screening non-ground foreign matter and excluding external noise interference, etc.

4.2) According to different description manners of the above-mentioned state vector and detection vector on the detection target, it can be determined that there is a transformation relation between the two vectors as shown in the following calculation formula (2-2):

$$u(k) = H(S(k)) + v(k) \quad (2\text{-}2)$$

wherein H(·) is a measurement matrix and v(k) is a measurement noise covariance matrix. The measurement matrix is expressed by the following formula (2-3):

$$H(S(k)) = \begin{bmatrix} \sqrt{x^2 + y^2 + z^2} \\ \tan^{-1}(x, y) \\ \tan^{-1}\left(z, \sqrt{x^2 + y^2}\right) \\ \dfrac{x\dot{x} + y\dot{y} + z\dot{z}}{\sqrt{x^2 + y^2 + z^2}} \end{bmatrix} \quad (2\text{-}3)$$

wherein x, y, and z respectively represent position information of the detection target in a three-dimensional coordinate system; the first derivatives of x, y, and z respectively represent the velocity information of the detected object in the three-dimensional coordinate system.

4.3) In some embodiments, typical Kalman filtering is based on a linear model. However, as shown in the above formula (2-2), the transformation relation between the state vector and the detection vector is a non-linear relation.

Thus, in order to be applied to the Kalman filter, the transformation relation between the two may be linearized to form a linearization relation shown by the following formula (2-4):

$$u(k) = H(S_{apr}(k)) + J_H(S_{apr}(k))[S(k) - S_{apr}(k-1)] + v(k) \quad (2\text{-}4)$$

wherein u(k) is a current detection vector of a millimeter wave radar, H is a measurement matrix, and $S_{apr}(k)$ is: a prior estimate calculated by the state conversion formula based on the state vector obtained after Kalman filtering processing at a moment of k−1. $J_H$ is obtained by Taylor series expansion as shown in the following Formulas (2-5):

$$J_H = \begin{bmatrix} \dfrac{x}{r} & \dfrac{y}{r} & \dfrac{z}{r} & 0 & 0 & 0 \\ \dfrac{y}{x^2 + y^2} & \dfrac{-x}{x^2 + y^2} & 0 & 0 & 0 & 0 \\ -\dfrac{x}{r^2}\dfrac{z}{\sqrt{x^2+y^2}} & -\dfrac{y}{r^2}\dfrac{z}{\sqrt{x^2+y^2}} & \dfrac{\sqrt{x^2+y^2}}{r^2} & 0 & 0 & 0 \\ \dfrac{y(\dot{x}y - \dot{y}x) + z(\dot{x}z - \dot{z}x)}{r^3} & \dfrac{x(\dot{y}x - \dot{x}y) + z(\dot{y}z - \dot{z}y)}{r^3} & \dfrac{x(\dot{z}x - \dot{x}z) + y(\dot{z}y - \dot{y}z)}{r^3} & \dfrac{x}{r} & \dfrac{y}{r} & \dfrac{z}{r} \end{bmatrix} \quad (2\text{-}5)$$

In some embodiments, the Kalman filtering algorithm may be implemented based on the state vector, the detection vector, the state conversion formula, and the linearization relation between the state vector and the detection vector according to an embodiment of the present disclosure, and the specific derivation and implementation processes thereof are not be described in detail herein.

The specific examples of the state vector, the detection vector, the state conversion formula, and the linearization relation between the state vector and the detection vector according to an embodiment of the present disclosure are for illustrative purposes only are not intended to limit the scope of the present disclosure. In some embodiments, one or more steps and parameters thereof may be adjusted, replaced or changed according to practical requirements or actual situations such as the characteristics of a specific use scenario, and other state vectors, detection vectors, state conversion formulas and linearization relations between the state vectors and the detection vectors may be obtained by reasonable derivation.

The above embodiments describe the processing of radar data using a millimeter wave radar as an example. Based on the same principles, it can also be applied for use in other different types of radar, not limited to millimeter wave radar. For this reason, in order to avoid unnecessary limitations, the term "radar" is used instead in the following.

Figure 3:
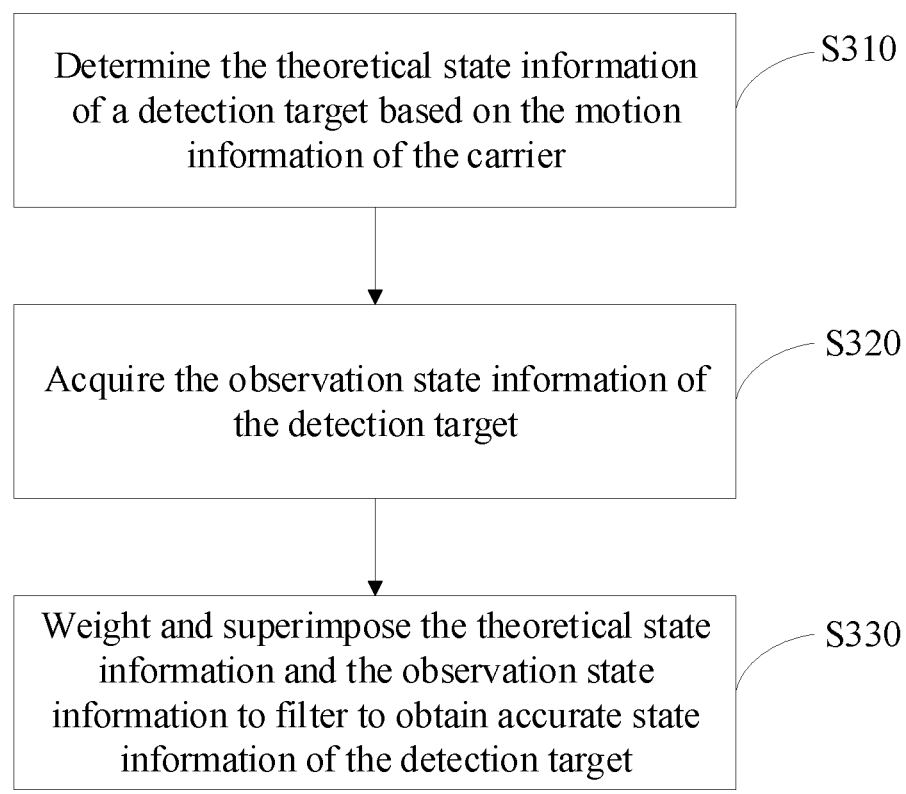
FIG. 3 is a method flow diagram of a radar data screening method according to an embodiment of the present disclosure.

FIG. 3 is a method flow diagram of a radar data screening method according to an embodiment of the present disclosure. The radar data filtering method is based on the Kalman filtering principle shown in FIG. 2A-FIG. 2C, by introducing the data source related to the motion information to help to obtain a more accurate detection target. As shown in FIG. 3, the radar data screening method comprises the following steps:

S310: determining theoretical state information of the detection target based on the motion information of the carrier.

The carrier may in particular be any suitable type of mobile device, such as the unmanned aerial vehicle shown in FIG. 1, the implementation of which is not particularly limited here. "Motion information" refers to information related to the motion of the carrier, or data items used to describe or define the motion of the carrier, such as acceleration, etc. "Status information" refers to data information that directly describes the status of a detected object at a certain time. For example, the state vector in the specific example above may include position, velocity, and acceleration. According to the embodiment, a term such as "theoretical state information" is used to represent state information that is derived from the carrier motion.

S320: acquiring the observation state information of the radar to the detection target.

For example, as shown in FIG. 1, a radar is mounted on a carrier. In order to distinguish between relatively independent data from two sources, the term "observation state information" is used in this embodiment to refer to information obtained through radar detection. For example, the observation vector in the specific example above may include relative distance, relative direction angle, relative pitch angle, and relative radial velocity.

S330: weighting and superimposing the theoretical state information and the observation state information to filter to obtain accurate state information of the detection target.

Here, "weighting and superimposing" refers to an operation in which two groups of data are given appropriate weight coefficients, multiplied by the weight coefficients and then added. As shown in FIG. 2C above, the theoretical state information and the observation state information are two relatively independent data sources, which can help to complete the combination between the two data by calculating the Kalman gain coefficient and then using the same as a weighting and superimposing coefficient, so that more accurate state information can be selected, and radar data filtering can be realized to eliminate the influence of non-ground targets or external noise.

Figure 4:
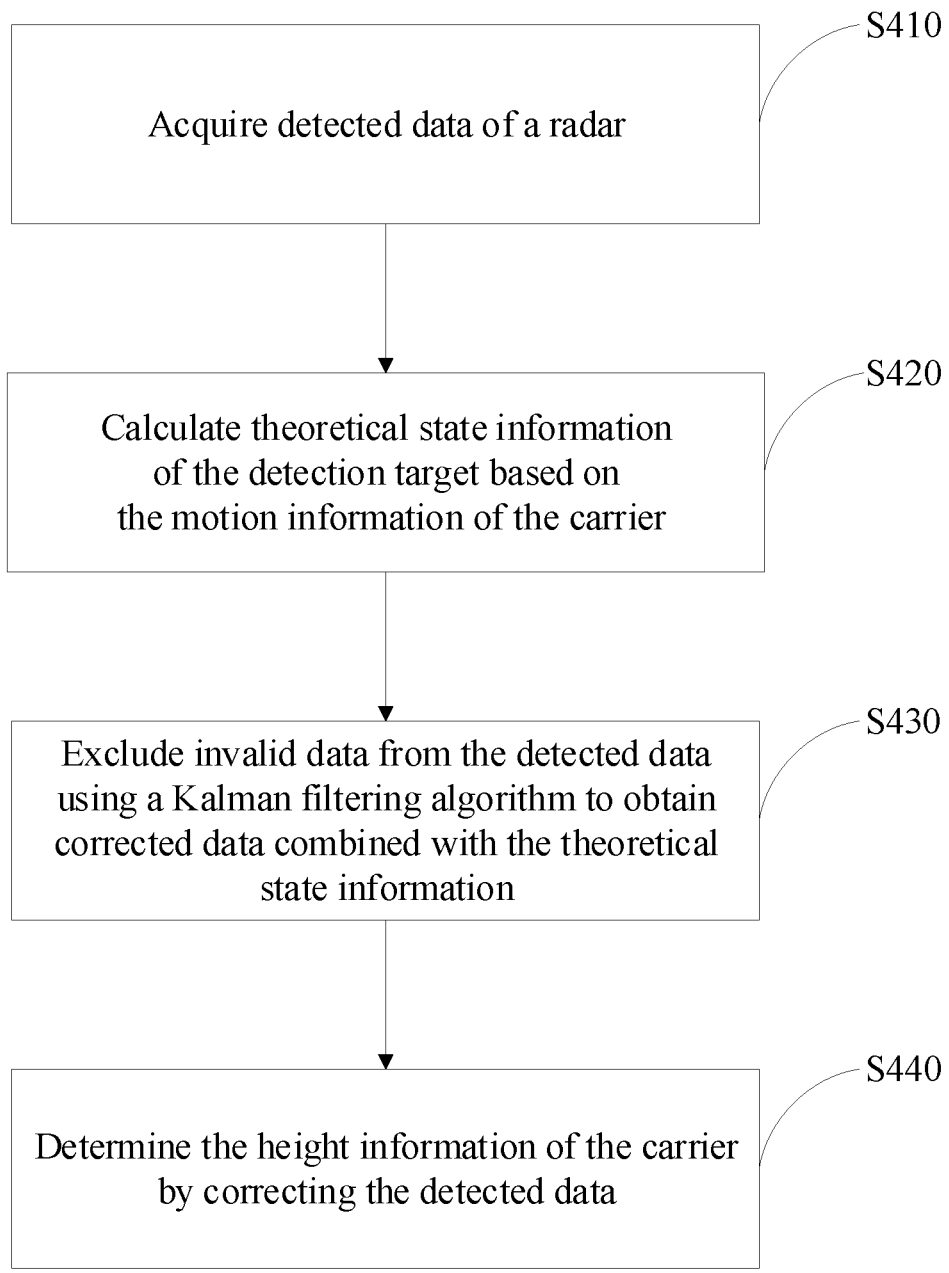
FIG. 4 is a method flow diagram of a height information correction method according to an embodiment of the present disclosure.

FIG. 4 is a method flow diagram of a height information correction method according to an embodiment of the present disclosure. The height information correction method is implemented by using the Kalman filtering algorithm. As shown in FIG. 4, the height information correction method comprises the following steps:

S410: acquiring detected data of the radar.

As described above, the detected data contains observation state information of the detection target. In this embodiment, the term "observation state information" is used to indicate data information detected by a radar sensor. It may have corresponding specific data according to actual situations. For example, the observation vectors in the specific examples described above may include relative distance, relative direction angle, relative pitch angle, and relative radial velocity.

S420: calculating theoretical state information of the detection target based on the motion information of the carrier.

The radar is mounted on a vehicle. The carrier may be any suitable type of mobile device, such as the unmanned aerial vehicle shown in FIG. 1, the implementation of which is not particularly limited here.

"Motion information" refers to information related to the motion of the carrier, or data items used to describe or define the motion of the carrier, such as acceleration, etc. The "theoretical state information" refers to information that can directly describe the state of the detection target at a certain moment, and is obtained by calculation according to the movement of the carrier. For example, the state vector in the specific example above may include position, velocity, and acceleration.

S430: excluding invalid data from the detected data using a Kalman filtering algorithm to obtain corrected data by combining the detected data with the theoretical state information.

The theoretical state information and the detected data are two relatively independent data sources. As described in the specific example above, the two can be combined by calculating a Kalman gain factor to exclude invalid data related to non-ground targets from the detected data.

According to the embodiment, for convenience of statement, the term "invalid data" is used to indicate observation state information belonging to a non-ground target among radar detected data. As described in the specific examples above, the non-ground target is characterized by a small volume or by a fast sweep of the unmanned aerial vehicle. Thus, a metric may be the time required for the carrier to pass the detection target. In other words, the detected object may be determined to be a non-ground target when the time required for the carrier to pass the detected object is less than a preset threshold.

S440: determining the height information of the carrier by correcting the detected data.

Wherein the influence and interference of those non-ground targets are excluded from the corrected data, and the height information obtained from this calculation can reflect the true height from the ground of the carrier more accurately to eliminate the influence of non-ground targets or external noise.

In some embodiments, the "corrected data" in the method steps shown in FIG. 4 is a combination of the precise state information of one or more targets of detection in the method steps shown in FIG. 3. In other words, after invalid data is filtered out, the remaining accurate state information of the detection target is corrected data.

One of the advantageous aspects of the height information correction method according to an embodiment of the present disclosure is that: the motion information of the carrier is introduced into the radar detected data by using the Kalman filtering algorithm, so that the detected data corresponding to the foreign matters whose volume is small and the carrier can sweep quickly can be effectively excluded from the original radar detected data, so that the height information of the carrier obtained by detection can reflect the actual flight situation more truly, and avoid unnecessary obstacle avoidance warning or flight posture adjustment.

In some embodiments, in the process of performing height information correction (e.g. step S430) and filtering to obtain accurate state information of the detection target (e.g. step S330), it is also possible to iteratively perform a plurality of Kalman filtering processes, and correspondingly output the state information estimate of the detection target obtained after the Kalman filtering processing as filtered data, and apply same to the subsequent calculation of the height above ground information.

Specifically, after the Kalman filtering processing by the above-mentioned iteration, observation state information of a false detection target formed by external noise may be included in the excluded invalid data. Therefore, it can reach an effect of filtering out external noise of unmanned aerial vehicle and other carriers in flight phase to improve the accuracy of height information.

Figure 5:
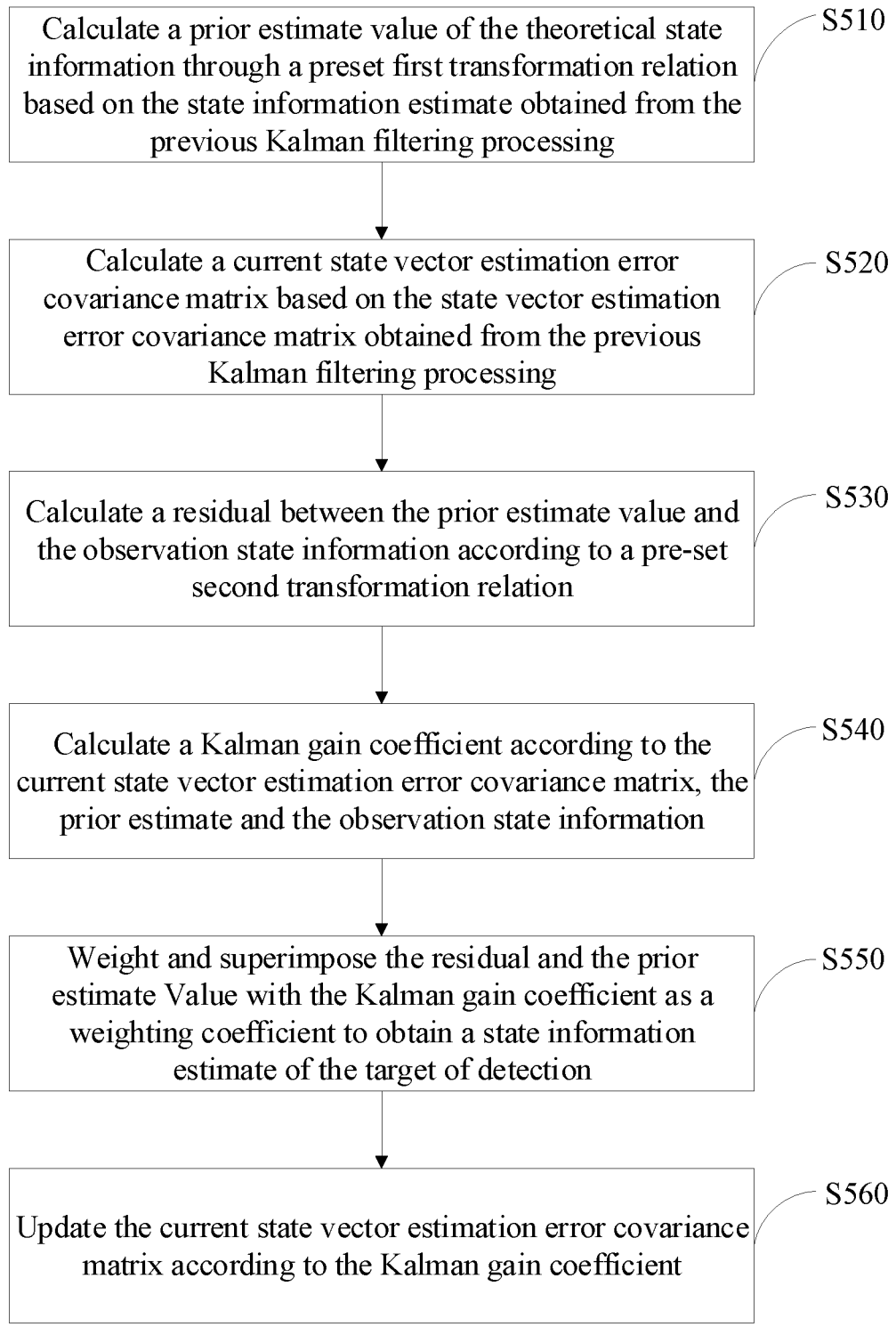
FIG. 5 is a flowchart of a method for Kalman filtering processing according to an embodiment of the present disclosure.

FIG. 5 is a flowchart of a method for Kalman filtering processing according to an embodiment of the present disclosure. It exemplifies the process of one iteration process. As shown in FIG. 5, the Kalman filtering processing includes:

S510: calculating a prior estimate of the theoretical state information through a preset first transformation relation based on the state information estimate obtained from the previous Kalman filtering processing;

Wherein, the "first transformation relation" is a function representing a change situation between theoretical state information of theoretical state information at different times. It may be established based on an acceleration model of the carrier, for example, it may be a state conversion formula as described above.

In other embodiments, the prior estimate may also be corrected directly from the acceleration information of the carrier when calculating the prior estimate.

S520: calculating a current state vector estimation error covariance matrix based on the state vector estimation error covariance matrix obtained from the previous Kalman filtering processing.

The covariance matrix refers to a matrix representing the relation between different data. According to the embodiment, the "state vector estimation error covariance matrix" is a symmetric matrix for expressing correlations between a plurality of different information between theoretical state information. Each element in the covariance matrix represents a relation between different state variables.

S530: calculating a residual between the prior estimate and the observation state information according to a pre-set second transformation relation;

The "second transformation relation" refers to a correspondence relation between the observation state information and the theoretical state information. As described in the specific example above, when applied to Kalman filtering, the second transformation relation is a linearized transformation relation.

S540: calculating a Kalman gain coefficient according to the current state vector estimation error covariance matrix, the prior estimate and the observation state information.

Here, the "Kalman gain factor" indicates the relative reliability of theoretical state information or observation state information. In other words, it can reflect how well theoretical state or observation state is accurate. It will be appreciated that in the process of weighted overlap, the more reliable or correctly handled parts should have higher weights.

S550: weighting and superimposing the residual and the prior estimate with the Kalman gain coefficient as a weighting coefficient to obtain a state information estimate of the detection target.

After the Kalman gain factor is determined, more accurate state data can be obtained by weighting and superimposing. According to the embodiment, the term "state information estimate" is used to represent the point cloud data obtained after the Kalman filtering process. Due to the combination of the motion information of the carrier and the detection information of the millimeter-wave radar, the observation state data corresponding to the non-ground targets whose volume is small and the carrier can quickly pass through are excluded from the correction data because they are treated as invalid data due to the small Kalman gain coefficient.

S560: updating the current state vector estimation error covariance matrix according to the Kalman gain coefficient.

The state vector estimation error covariance matrix also needs to be updated independently of the output state information estimate after processing so that it can be applied to the next Kalman filtering processing to realize multiple iterations.

The flow chart of the method shown in FIG. 5 is only used for exemplifying and illustrating the steps that need to be performed, and is not used to limit the order of performing the steps, and the order between mutually independent steps can be arbitrarily adjusted without being limited to that shown in FIG. 5. For example, the updating step of the state vector estimation error covariance is independent of the calculation of the state information estimate, either before or after the calculation of the state information estimate.

In order to fully explain the specific implementation process of the Kalman filtering process, the method steps shown in FIG. 5 are described in detail below by taking the state transformation formula, the state vector, the observation vector and the linearized transformation relation between the two described in Formulas (1-1) to (2-5) of the above-mentioned specific example.

1) When step S510 is performed, the prior estimate may be calculated as shown in the following formula (3-1):

$$S_{apr}(k)=FS(k-1) \qquad (3-1)$$

wherein $S_{apr}(k)$ is a prior estimate, $S(k-1)$ is an estimate of state information obtained from the previous Kalman filtering processing, and F is a state transform matrix.

2) In performing step S520, the covariance matrix may be calculated as shown in the following formula (3-2):

$$P_{apr}(k)=FP(k-1)F^T+Q(k-1) \qquad (3-2)$$

wherein $P_{apr}(k)$ is a current state vector estimation error covariance matrix; $P(k-1)$ is a state vector estimation error covariance matrix updated after the previous Kalman filtering processing; and $Q(k-1)$ is a process noise covariance matrix.

"Process noise" refers to external forces that occur to the system by accident and cannot be tracked, e.g. an unmanned aerial vehicle is subject to sudden wind effects. These uncertainty factors can be modeled uniformly to add a corresponding term in formula (3-2).

3) In performing step S530, a residual between the prior estimate and the observation state information may be calculated as shown in the following formula (3-3):

$$y(k)=u(k)-H(S_{apr}(k)) \qquad (3-3)$$

wherein $y(k)$ is the residual, $u(k)$ is the observation state information, $S_{aqr}(k)$ is the prior estimate; and $H(\cdot)$ is the measurement matrix.

4) when step S540 is performed, the Kalman gain coefficient may be calculated as shown in the following formula (3-4):

$$K(k) = \frac{P_{apr}(k)J_H^T(S_{apr}(k))}{J_H(S_{apr}(k))P_{apr}(k)J_H^T(S_{apr}(k))+R(k)} \qquad (3-4)$$

wherein $P_{aqr}(k)$ is the current covariance matrix, $S_{aqr}(k)$ is the prior estimate, and $R(k)$ is the measurement noise covariance matrix.

"Measurement noise" refers to a situation where the readings of a sensor such as a radar fluctuate within a certain range due to Gaussian noise. In other words, radar data acquired by radar acquisition may appear as Gaussian spots with a range.

5) When step S550 is performed, the state information estimate may be calculated as shown in the following formulas (3-5):

$$S(k)=S_{apr}(k)+K(k)y(k) \qquad (3\text{-}5)$$

wherein S(k) is a state information estimate; K(k) is a Kalman gain coefficient; $S_{aqr}(k)$ is a prior estimate; and y(k) is a residual.

6) When step S560 is performed, the posteriori error covariance matrix may be updated as shown in the following formulas (3-6):

$$P(k)=P_{apr}(k)-K(k)J_H(S_{apr}(k))P_{apr}(k) \qquad (3\text{-}6)$$

wherein P(k) is an updated state vector estimation error covariance matrix, $P_{aqr}(k)$ is a current state vector estimation error covariance matrix, K(k) is a Kalman gain coefficient, and $S_{aqr}(k)$ is the prior estimate.

One of the advantageous aspects of the height detection method according to an embodiment of the present disclosure is: the Kalman filtering is used to filter the point cloud data from the combination of the theoretical state information and the observation state information of the detection target to filter out the small-volume interference foreign matter and the false foreign matter caused by the external noise during the flight of the unmanned aerial vehicle.

In addition to using Kalman filtering to eliminate small volume foreign matter interference, another embodiment of the present disclosure provides steps of a method for acquiring specific height information combined with a carrier posture. In the present disclosure, in order to distinguish from the above-mentioned method step of removing interference by Kalman filtering, it is hereinafter simply referred to as "a height detection method combined with a carrier posture".

In order to fully explain the specific application process of the height detection method combined with the carrier posture according to an embodiment of the present disclosure in the application scenario shown in FIG. 1, the principle of how to calculate the height from the ground combined with the posture of an unmanned aerial vehicle is described in detail below combined with FIG. 6.

Firstly, the roll angle and pitch angle of the unmanned aerial vehicle will change inevitably during the flight, which makes the normal direction of the radar cannot always be perpendicular to the ground.

The applicant found that: when the radar is installed on the unmanned aerial vehicle, the deviation angle between the normal direction of the millimeter wave radar and the vehicle body coordinate axis Z axis (i.e., the vertical downward direction shown in FIG. 6) of the unmanned aerial vehicle can be acquired according to the posture information of the unmanned aerial vehicle, and the height above ground information of the unmanned aerial vehicle can be further determined or corrected.

Figure 6:
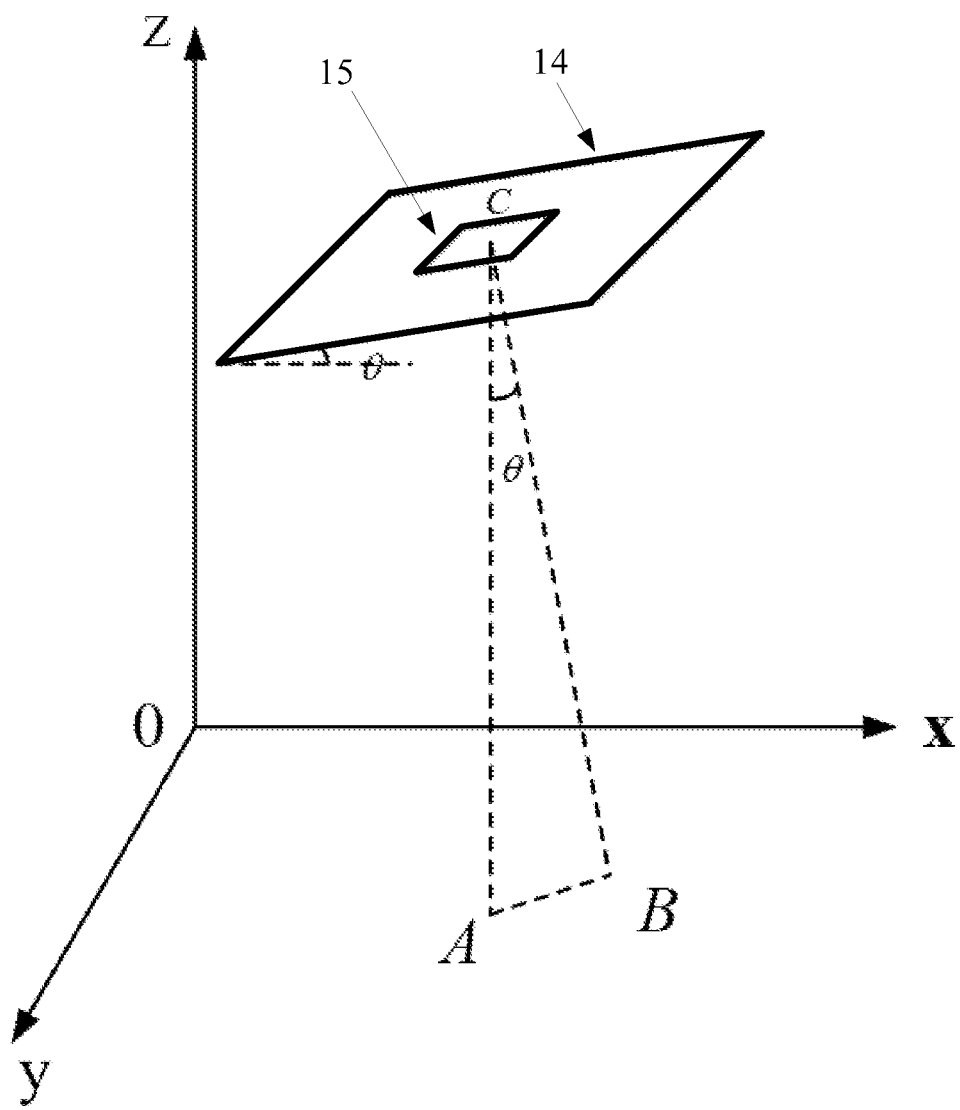
FIG. 6 is a schematic diagram of an unmanned aerial vehicle and a radar according to an embodiment of the present disclosure, illustrating the tilting of the unmanned aerial vehicle.

By way of example of the radar installation as shown in FIG. 6, the radar 15 may be fixedly installed on the abdomen 14 of the unmanned aerial vehicle. The abdomen 14 of the vehicle body is the portion of the vehicle body that faces the ground when the unmanned aerial vehicle is flying.

Wherein point C is the antenna phase center of the radar 15, CB is the normal direction of the radar, CA is the height of the unmanned aerial vehicle, and CB is perpendicular to AB. The pitch angle of the unmanned aerial vehicle corresponds to the azimuth angle of the radar (for simplicity of presentation, hereinafter referred to as an azimuth angle), while the roll angle of the unmanned aerial vehicle corresponds to the pitch angle of the radar (for simplicity of presentation, hereinafter referred to as a pitch angle), both of which are consistent in positive and negative angle values.

Thus, it can be determined that the roll angle and the pitch angle of the unmanned aerial vehicle are equivalent to the deviation angle of the radar normal direction from the vehicle body coordinate system Z axis.

The specific examples of radar and unmanned aerial vehicle installations according to an embodiment of the present disclosure are for illustrative purposes only and are not intended to limit the scope of the present disclosure. In some embodiments, one or more steps and parameters thereof may be adjusted, replaced or changed according to practical requirements or actual situations such as the characteristics of a specific use scenario, and the corresponding relation between the deviation angle of the radar normal direction from the vehicle body coordinate system Z axis of the unmanned aerial vehicle and the posture information of the unmanned aerial vehicle in other installation methods may be obtained through reasonable deduction.

Figure 7A:
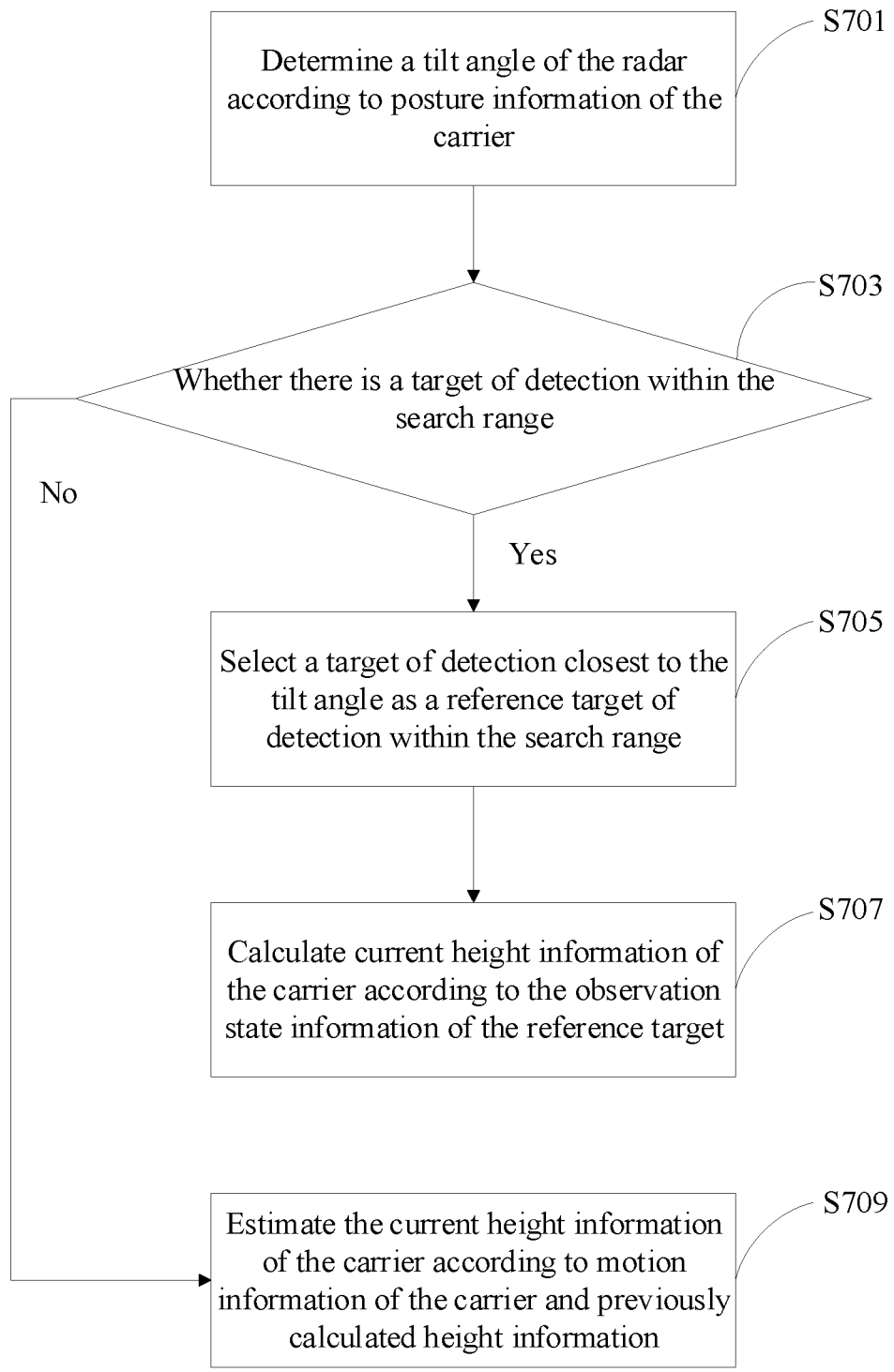
FIG. 7A is a schematic diagram of a height information correction method combining posture information according to an embodiment of the present disclosure.

FIG. 7A is a method flow diagram of a method for height detection combined with a carrier posture according to an embodiment of the present disclosure. As shown in FIG. 7A, the method for height detection combined with a carrier posture includes the steps of:

S701: determining a tilt angle of the radar according to posture information of the carrier.

Here, "posture information" refers to a tilt angle of the carrier in a three-dimensional space. It may be described by any suitable means, such as quaternions, Euler angles, etc. "Tilt angle" refers to the deviation between the normal direction of the radar and the direction perpendicular to the ground. In some embodiments, for example, as shown in FIG. 6, the tilt angle may be a combination of two items of data of a pitch angle and a roll angle of an unmanned aerial vehicle (i.e., equivalent to an azimuth angle and a pitch angle of a radar).

S703: determining whether there is a detection target within the search range in the corrected data. If so, executing step S705; if not, executing step S709.

The search range refers to a numerical range formed by floating up and down an allowable error based on the tilt angle. The allowable error is an empirical value and can be set according to the requirements of actual situations. Preferably, the tolerance may be set to 5 degrees.

In S705: selecting a detection target closest to the tilt angle as a reference target within the search range.

There may be one or more targets of detection within the search range. In the case of only one, there is no need to select and it can be determined directly as a reference target of detection. When there is a plurality of targets of detection, the closest detection target is selected as the reference target.

S707: calculating current height information of the carrier according to the observation state information of the reference target.

Herein, "observation state information" as described above refers to a series of data signals corresponding to ground targets obtained by radar detection. It can use one or a plurality of kinds of data information to calculate the height above ground as the current height information of the carrier.

S709: estimating the current height information of the carrier according to motion information of the carrier and previously calculated height information.

Herein, "motion information" refers to the movement of a carrier in a three-dimensional space. Based on the calculation of the motion information, the relative amount of change of the height information before and after the motion can be obtained. Thus, in the case where no target is detected, the height information of the current carrier can be approximately obtained by using the previously determined historical height information and the relative change amount determined by the motion information.

Figure 7B:
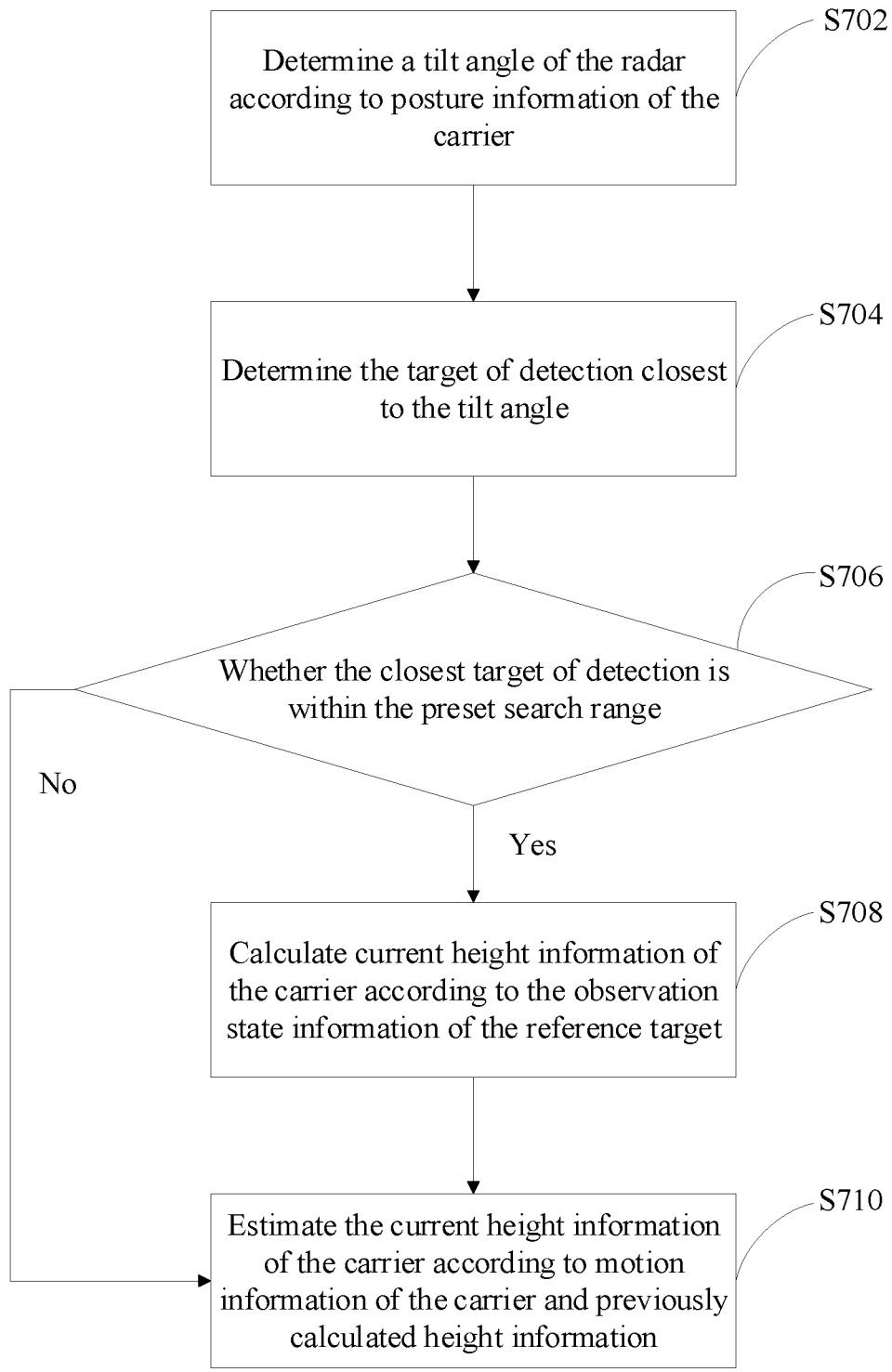
FIG. 7B is a schematic diagram of a height information correction method combining posture information according to another embodiment of the present disclosure.

In other embodiments, the method shown in FIG. 7B may also be used to achieve the same effect of screening to determine the closest detection target to the tilt angle. As shown in FIG. 7B, the method comprises:

S702: determining a tilt angle of the radar according to posture information of the carrier.

Here, "posture information" refers to a tilt angle of the carrier in a three-dimensional space. It may be described by any suitable means, such as quaternions, Euler angles, etc. "Tilt angle" refers to the deviation between the normal direction of the radar and the direction perpendicular to the ground. In some embodiments, for example, as shown in FIG. 5, the tilt angle may be a combination of two items of data of a pitch angle and a roll angle of an unmanned aerial vehicle (i.e., equivalent to an azimuth angle and a pitch angle of a radar).

S704: determining the detection target closest to the tilt angle.

The target closest to the tilt angle can be determined through the point cloud data of the radar. In some embodiments, where there are multiple different items of data for the tilt angle, the "closest" may be determined based on the difference from all the items of data.

S706: determining whether the closest detection target is within a pre-set search range, if yes, executing step S708, and if no, executing step S710.

The search range refers to a numerical range formed by floating up and down an allowable error based on the tilt angle. The allowable error is an empirical value and can be set according to the requirements of actual situations. Preferably, the allowable error may be set to 5 deg. i.e., the search range is ($\alpha$, $\beta$)+5 degrees or ($\alpha$, $\beta$)−5 degrees.

S708: calculating current height information of the carrier according to the observation state information of the reference target.

Here, "observation state information" as described above refers to a series of data signals obtained from radar detection. It can use one or a plurality of kinds of data information to calculate the height above ground as the current height information of the carrier.

S710: estimating the current height information of the carrier according to motion information of the carrier and previously calculated height information.

Herein, "motion information" refers to the movement of a carrier in a three-dimensional space. Based on the calculation of the motion information, the relative amount of change of the height information before and after the motion can be obtained. Thus, in the case where no target is detected, the height information of the current carrier can be approximately obtained by using the previously determined historical height information and the relative change amount determined by the motion information.

In some embodiments, when the posture information of the carrier is represented by quaternions, the following steps may also be included: first, the quaternions of the carrier is acquired. Then the quaternions are converted to Euler angles to acquire the pitch and roll angles of the carrier.

Specifically, the transformation method between quaternions and Euler angles can be expressed by the following formula (4):

$$\begin{bmatrix} \alpha \\ \beta \\ \gamma \end{bmatrix} = \begin{bmatrix} a\tan 2(2(q_1 q_2 + q_3 q_4), 1 - 2(q_2^2 + q_3^2)) \\ \arcsin(2(q_1 q_3 - q_2 q_4)) \\ a\tan 2(2(q_1 q_4 + q_2 q_3), 1 - 2(q_3^2 + q_4^2)) \end{bmatrix} \quad (4)$$

the quaternions are represented by [$q_1$, $q_2$, $q_3$, $q_4$]; the Euler angles are represented by [$\alpha$, $\beta$, $\gamma$].

In some embodiments, the above-mentioned step S707 or step S708 specifically comprises: first, acquiring a distance between the reference target and the radar, and an azimuth angle of the radar; then calculating current height information of the carrier based on a distance between the reference target and the radar and the azimuth angle by a trigonometric function.

Specifically, as shown in FIG. 6, the height above ground of the carrier can be calculated by the following formula (5):

$$H = R \cos \beta \quad (5)$$

wherein H is the current height information of the carrier, R is a distance between the reference target and the radar, and $\beta$ is an azimuth angle of the radar.

In some embodiments, the above-mentioned step S690 or step S610 specifically comprises: estimating the current height information of the carrier by the following formula (6):

$$H(k) = H(k-1) + vt + 0.5 at^2 \quad (6)$$

wherein H(k) is the current height information of the carrier, and H(k−1) is the previously calculated height information; v is the velocity of the carrier in the height direction; a is the acceleration of the carrier in the height direction; t is the time elapsed between H(k) and H(k−1), for example, the refresh time of a millimeter wave radar.

One of the advantageous aspects of the height information detection method according to an embodiment of the present disclosure is: when the unmanned aerial vehicle and other similar carriers tilt during flight and the radar antenna normal direction is not perpendicular to the ground, it can be corrected to obtain accurate height information.

Another advantageous aspect of the height information detection method according to an embodiment of the present disclosure is: when the radar does not detect the ground target information, the current altitude information can be estimated by calculating the relative change of altitude and historical altitude information combined with the motion information to ensure that the radar-based altitude detection method can also be used in the non-vertical state.

Based on the corrected height information obtained by the height information correction method, the embodiments of the present disclosure also provide an automatic obstacle avoidance method. The automatic obstacle avoidance method comprises the following steps:

first, more accurate carrier height information may be calculated using the height information correction method for one or more embodiments described above. Then, it is determined whether the height information is less than a preset height threshold. Finally, the obstacle avoidance warning is triggered if it is less than a preset height threshold. If it is not less than the preset height threshold value, the original running track of the unmanned aerial vehicle or the like can be continuously maintained.

In some embodiments, the preset height threshold is an empirical value that can be adjusted or set according to the needs of the actual situation. In some embodiments, other suitable decision criteria (e.g., an altitude rate of change threshold) may also be adjusted, without limitation to an altitude threshold. In other embodiments, triggering the obstacle avoidance warning may also be replaced with other suitable obstacle avoidance operations, such as automatically raising the altitude or changing the course trajectory, etc. in response to changes in altitude information.

According to an embodiment of the present disclosure, one of the advantageous aspects of the automatic obstacle avoidance method is: the above-mentioned height information correction method excludes invalid data corresponding to a small volume of non-ground targets from the point cloud data provided by the above-mentioned height information correction method, and thus the height information obtained by calculating would not be affected by these non-ground targets to avoid falsely triggering obstacle avoidance warning and/or changing the navigation track of an unmanned aerial vehicle or the like during an automatic obstacle avoidance process.

Figure 8:
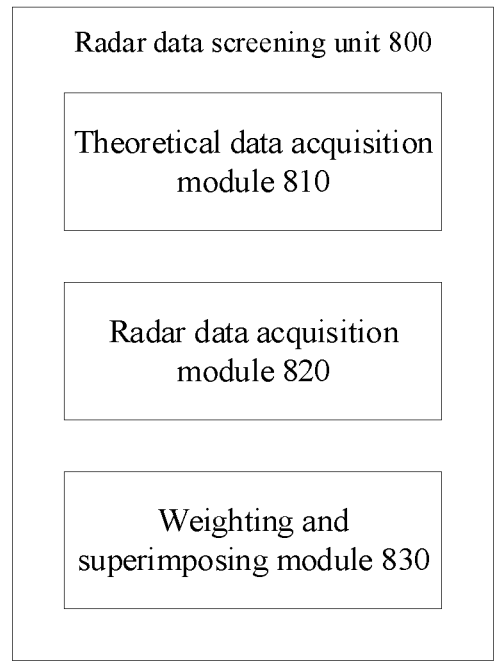
FIG. 8 is a functional block diagram of a radar data screening apparatus according to an embodiment of the present disclosure.

FIG. 8 shows a radar data screening apparatus according to an embodiment of the present disclosure. The radar data screening device 800 comprises: a theoretical data acquisition module 810, a radar data acquisition module 820, and a weighting and superimposing module 830.

The theoretical data acquisition module 810 is configured to determine theoretical state information of the detection target based on the motion information of the carrier. The radar data acquisition module 820 is configured to acquire observation state information of the detection target by a radar; the radar is mounted on a carrier. The weighting and superimposing module 830 is configured to weight and superimpose the theoretical state information and the observation state information to filter accurate state information for obtaining the detection target.

In some embodiments, the weighting and superimposing module 830 is specifically configured to iterate the Kalman filtering a plurality of times based on the observation state information and the theoretical state information; output a state information estimate of the detection target obtained after each Kalman filtering processing as accurate state information of the detection target.

Figure 9A:
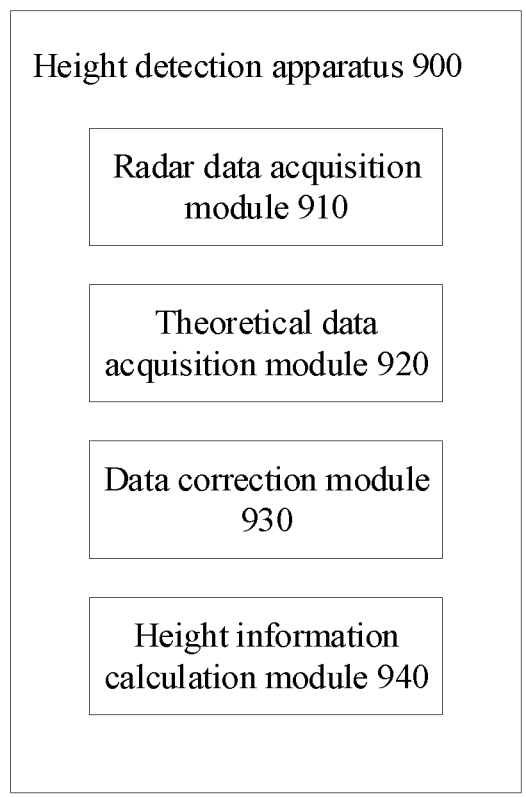
FIG. 9A is a functional block diagram of a height information correction apparatus according to an embodiment of the present disclosure.

FIG. 9A is a functional block diagram of a height information correction apparatus according to an embodiment of the present disclosure. As shown in FIG. 9A, the height information correction apparatus 900 may include: a radar data acquisition module 910, a theoretical data acquisition module 920, a data correction module 930 and an altitude information calculation module 940.

The radar data acquisition module 910 is used for acquiring detected data of a radar. The detected data comprises: observation state information of the detection target. The theoretical data acquisition module 920 is configured to calculate theoretical state information of the detection target based on the motion information of the carrier. The radar is mounted on the carrier. a data correction module 930 configured to exclude invalid data from the detected data using a Kalman filtering algorithm to obtain corrected data by combining the detected data with the theoretical state information; and a height information calculation module 940 configured to determine the height information of the carrier according to the corrected data;

Specifically, the invalid data is observation state information of a non-ground target. The non-ground target is: a detection target having an elapsed time of less than a preset threshold value; the elapsed time is the time required for the carrier to pass the detection target.

In some embodiments, the data correction module 930 is specifically configured to iterate the Kalman filtering a plurality of times based on the observation state information and the theoretical state information; output a state information estimate of the detection target obtained after each Kalman filtering processing as the corrected data.

Specifically, the theoretical state information includes: position information, velocity information and acceleration information of the detection target in a three-dimensional coordinate system; the observation state information comprises: a distance between the detection target and the radar, a direction angle of the detection target with respect to the millimeter wave radar, a pitch angle of the detection target with respect to the radar, and a radial speed of the detection target with respect to the radar.

Figure 9B:
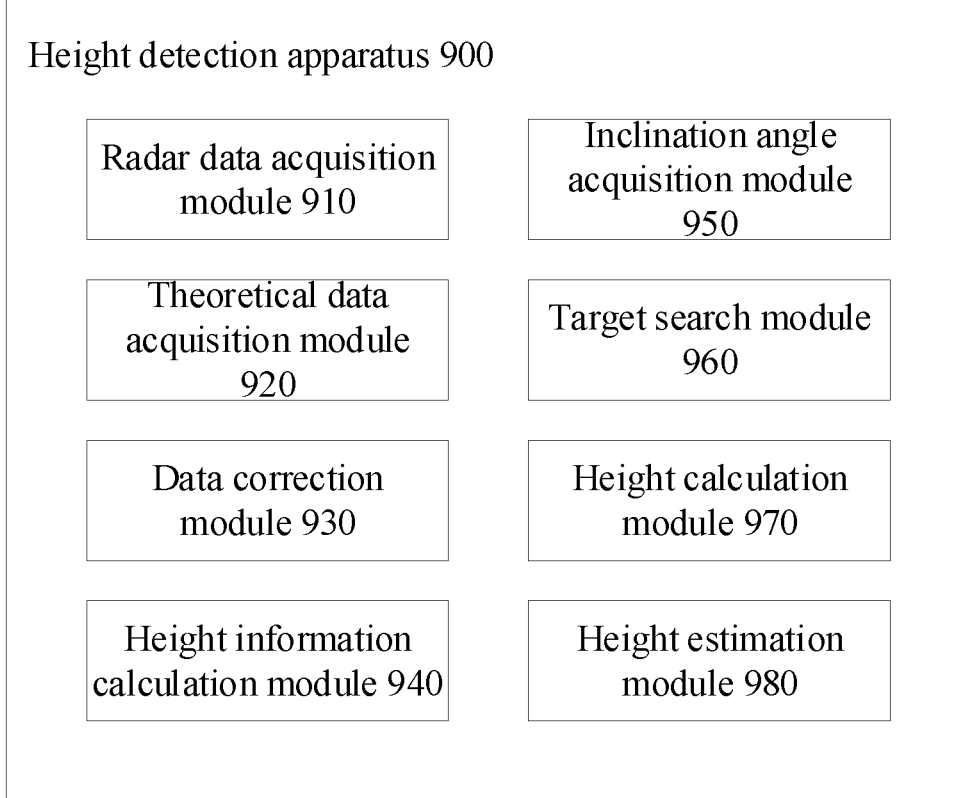
FIG. 9B is a functional block diagram of a height information correction apparatus according to another embodiment of the present disclosure.

In other embodiments, referring to FIG. 9B, in addition to the functional modules described above, the altitude information correction apparatus 900 may further comprise: a tilt angle acquisition module 950, a target search module 960, a height calculation module 970, and a height estimation module 980.

The tilt angle acquisition module 950 is configured to determine the tilt angle of the radar according to the posture information of the carrier; the target search module 960 is configured to determine whether there is a detection target in the search range among the corrected data; the search range is formed by floating up and down an allowable error based on the tilt angle. The height calculation module 970 is configured to select a detection target closest to the tilt angle as a reference target when there is a detection target in the search range; and calculate current height information of the carrier according to the observed data of the reference target; the height estimation module 980 is configured to estimate the current height information of the carrier according to the motion information of the carrier and the previously calculated height information when there is no target in the search range.

Specifically, the radar is provided at the bottom of the carrier proximate to the ground, and a tilt angle of the radar comprises: a pitch angle of the carrier as an azimuth angle of the radar; and a roll angle of the carrier as a pitch angle of the millimeter-wave radar.

In some embodiments, the height calculation module 970 is specifically configured to acquire a distance between the reference target and the radar, and an azimuth angle of the radar; calculate current height information of the carrier based on a distance between the reference target and the radar and the azimuth angle by a trigonometric function.

In the embodiments of the present disclosure, the method steps to be realized by the apparatus according to an embodiment of the present disclosure are described in detail. For the convenience and brevity of the description, reference may be made to the corresponding processes in the foregoing method embodiments for the specific working processes of the apparatus and modules described above, which will not be described in detail here. In some embodiments, the elements and algorithm steps of the examples described in connection with the embodiments disclosed herein may be implemented as electronic hardware, computer software, or combinations of both, and that the elements and steps of the examples have been described above generally in terms of their functionality in order to clearly illustrate this interchangeability of hardware and software. Whether such functionality is implemented as hardware or software depends upon the particular application and design constraints imposed on the implementation. In some embodiments, the described functionality may be implemented in varying ways for each particular application, but such implementation should not be interpreted as causing a departure from the scope of the present disclosure.

In some embodiments, the described functionality may be implemented in varying ways for each particular application, but such implementation should not be interpreted as causing a departure from the scope of the present disclosure. The computer software may be stored in a computer-readable storage medium, which when executed, may include the flow of embodiments of the methods as described above. The storage medium can be a magnetic disk, an optical disk, a read-only storage memory or a random storage memory, etc.

Figure 10:
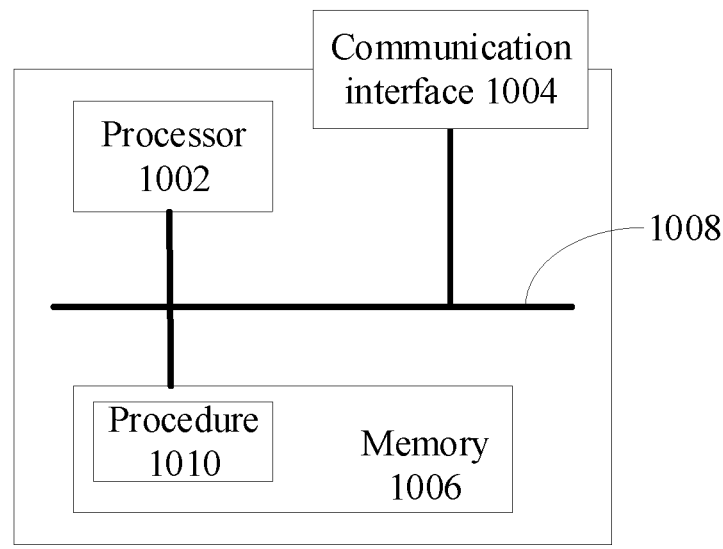
FIG. 10 is a schematic diagram of an electronic device according to an embodiment of the present disclosure.

FIG. 10 shows a structural diagram of an electronic device according to an embodiment of the present disclosure. For example, it may be a flight controller carried by the unmanned aerial vehicle as shown in FIG. 1.

As shown in FIG. 10, the electronic device may include: a processor 1002, a communications interface 1004, a memory 1006, and a communication bus 1008.

The processor 1002, the communication interface 1004, and the memory 1006 communicate with each other via communication bus 808. The communication interface 1004 is used for communicating with network elements of other devices, such as clients or other servers. The processor 1002 is used for executing a program 1010, which can specifically execute relevant steps in the above-mentioned altitude information correction method and radar data screening method embodiments.

In particular, the program 1010 may include program code that includes computer operating instructions. It may in particular be used to cause the processor 1002 to perform the height information correction method in any of the method embodiments described above.

In embodiments of the present disclosure, the processor 1002 may be a central processing unit (CPU), and may be other general purpose processors, digital signal processors (DSP), application specific integrated circuits (ASIC), field-programmable gate array gate arrays (FPGA) or other programmable logic devices, discrete gate or transistor logic devices, discrete hardware components, etc. depending on the type of hardware used.

The memory 1006 is used for storing programs 1010. The memory 1006 may comprise high-speed RAM memory, and may also comprise non-volatile memory, such as at least one disk memory, flash memory device, or other non-volatile solid-state memory device.

It has a program storage area and a data storage area for storing a program 1010 and corresponding data information, respectively. For example, non-volatile software programs, non-volatile computer-executable programs and modules stored in the program storage area, or calculation processing results, radar data and flight data stored in the data storage area.

Embodiments of the present disclosure also provide a computer-readable storage medium. The computer readable storage medium may be a non-volatile computer readable storage medium. The computer-readable storage medium stores a computer program.

The computer program, when executed by a processor, implements one or more of the steps of the height information correction method disclosed in the embodiments of the present disclosure. The complete computer program product is embodied on one or more computer-readable storage media (including, but not limited to, disk storage, CD-ROM, optical storage, etc.) containing the computer program disclosed in the embodiments herein.

In summary, a radar data screening method based on Kalman filtering is provided in the embodiment of the present application. According to the data filtering method, some invalid radar data is eliminated by a weighting and superimposing combined with the flight posture information of the unmanned aerial vehicle. The height information correction method based on the data filtering method can be regarded as invalid data and avoid the abrupt change of height information when the unmanned aerial vehicle passes through some foreign matters which cause significant change of radar height. Moreover, such an invalid data elimination method can further eliminate the interference of unknown external noise on the radar, and eliminate the high information mutation caused by the false target generated by noise.

A height detection method for correcting a detection point of a radar combined with flight posture information of an unmanned aerial vehicle is provided in another aspect according to an embodiment of the present application. When the unmanned aerial vehicle is inclined in flight and the radar antenna normal direction is not perpendicular to the ground, the method can correct and obtain accurate height information. Moreover, when ground target information is not detected by the radar, current altitude information is estimated combined with aircraft posture and historical altitude information.

Finally, the above embodiments are merely illustrative of the technical solutions of the present disclosure, rather than limiting it; combinations of features in the above embodiments or in different embodiments are also possible within the spirit of the invention, the steps can be implemented in any order, and there are many other variations of the different aspects of the disclosure described above, which are not provided in detail for the sake of brevity; although the present invention has been described in detail with reference to the foregoing embodiments, in some embodiments, the technical solutions disclosed in the above-mentioned embodiments can still be amended, or some of the technical features thereof can be replaced by equivalents; such corrections and substitutions do not depart from the spirit and scope of the present invention.

What is claimed is:

1. An automatic obstacle avoidance method for a carrier, comprising:
    acquiring detected data of a radar of the carrier, the detected data comprising observation state information of a detection target;
    calculating theoretical state information of the detection target based on motion information of the carrier;
    excluding invalid data from the detected data to obtain corrected data by combining the detected data with the theoretical state information;
    determining height information of the carrier according to the corrected data; and
    in response to determining that the height information of the carrier is less than a first pre-set height threshold value, triggering an obstacle avoidance warning or adjusting a course trajectory of the carrier to avoid a ground collision;
    wherein the invalid data comprises observation state information of a non-ground target, the non-ground target is a detection target having an elapsed time of less than a second pre-set threshold value, and the elapsed time is a time required for the carrier to pass the detection target.

2. The method according to claim 1, wherein the excluding invalid data from the detected data to obtain corrected data by combining the detected data with the theoretical state information comprises:
  iterating a plurality of Kalman filtering processes based on the observation state information and the theoretical state information; and
  outputting state information estimate of the detection target after each Kalman filtering process as the corrected data.

3. The method according to claim 2, wherein the invalid data further comprises: observation state information of false detection targets formed by external noise.

4. The method according to claim 2, wherein the Kalman filtering process comprises:
  calculating a prior estimate value of the theoretical state information through a pre-set first transformation relation based on the state information estimate obtained from a previous Kalman filtering process;
  calculating a current state vector estimation error covariance matrix based on a state vector estimation error covariance matrix obtained from the previous Kalman filtering process;
  calculating a residual between the prior estimate value and the observation state information according to a pre-set second transformation relation;
  calculating a Kalman gain coefficient according to the current state vector estimation error covariance matrix, the prior estimate value, and the observation state information;
  updating the current state vector estimation error covariance matrix according to the Kalman gain coefficient; and
  weighting and superimposing the residual and the prior estimate value with the Kalman gain coefficient as a weighting coefficient to obtain the state information estimate.

5. The method according to claim 4, wherein the theoretical state information comprises anyone or any combination of: position information, velocity information, and acceleration information of the detection target in a three-dimensional coordinate system; and
  the observation state information comprises: a distance between the detection target and the radar, a direction angle of the detection target with respect to the radar, a pitch angle of the detection target with respect to the radar, and a radial speed of the detection target with respect to the radar.

6. The method according to claim 4, wherein the pre-set first transformation relation is established based on an acceleration model of the carrier, the pre-set second transformation relation is a corresponding relation between the theoretical state information and the observation state information after linearization.

7. The method according to claim 6, further comprising:
  correcting the prior estimate value of the theoretical state information by acceleration information of the carrier.

8. The method according to claim 1, wherein the determining the height information of the carrier according to the corrected data comprises:
  determining a tilt angle of the radar according to posture information of the carrier;
  determining whether there is a detection target within a search range in the corrected data, the search range being formed by floating up and down an allowable error based on the tilt angle;
  in response to determining that there is a detection target within the search range, selecting a detection target closest to the tilt angle as a reference target within the search range;
  calculating current height information of the carrier according to the observation state information of the reference target; and
  in response to determining that there is no detection target within the search range, estimating the current height information of the carrier according to motion information of the carrier and previously calculated height information.

9. The method according to claim 8, wherein the radar is disposed at a bottom of the carrier proximate to the ground;
  the determining a tilt angle of the radar according to posture information of the carrier comprises:
  acquiring a pitch angle of the carrier as an azimuth angle of the radar, and
  acquiring a roll angle of the carrier as a pitch angle of the radar.

10. The method according to claim 9, further comprising:
  acquiring quaternions of the carrier; and
  converting the quaternions to Euler angles to acquire the pitch angle of the carrier and the roll angle of the carrier.

11. The method according to claim 9, wherein the calculating current height information of the carrier according to the observation state information of the reference target comprises:
  acquiring a distance between the reference target and the radar, and an azimuth angle of the radar;
  calculating current height information of the carrier based on the distance between the reference target and the radar and the azimuth angle by a trigonometric function.

12. The method according to claim 11, wherein the current height information of the carrier is calculated by using the following formula:

$$H = R \cos \beta$$

wherein H is the current height information of the carrier, R is the distance between the reference target and the radar, and $\beta$ is the azimuth angle of the radar.

13. The method according to claim 9, wherein the current height information of the carrier is estimated by using the following formula:

$$H(k) = H(k-1) + vt + 0.5at^2$$

wherein H(k) is the current height information of the carrier, and H(k−1) is a previously calculated height information; v is a velocity of the carrier in a height direction; a is an acceleration of the carrier in the height direction; t is time elapsed between H(k) and H(k−1).

14. An electronic device, comprising at least one processor, and a memory communicatively coupled to the at least one processor;
  wherein the memory stores instructions executable by the at least one processor to enable the at least one processor to perform the following operations:
  acquiring detected data of a radar of a carrier, the detected data comprising observation state information of a detection target;
  calculating theoretical state information of the detection target based on motion information of the carrier;
  excluding invalid data from the detected data to obtain corrected data by combining the detected data with the theoretical state information;

determining height information of the carrier according to the corrected data; and in response to determining that the height information of the carrier is less than a first pre-set height threshold value, triggering an obstacle avoidance warning or adjusting a course trajectory of the carrier to avoid a ground collision;

wherein the invalid data comprises observation state information of a non-ground target, the non-ground target is a detection target having an elapsed time of less than a second pre-set threshold value, and the elapsed time is a time required for the carrier to pass the detection target.

15. An unmanned aerial vehicle (UAV), comprising:
a vehicle body;
a radar disposed at the bottom of the vehicle body proximate to the ground;
a vehicle arm coupled to the vehicle body;
a power drive unit provided on the vehicle arm for providing flying power to the UAV; and
a flight controller provided on the vehicle body and communicatively coupled to the radar; wherein the flight controller is configured to:
acquire detected data of the radar, the detected data comprising observation state information of a detection target;
calculate theoretical state information of the detection target based on motion information of the UAV;
exclude invalid data from the detected data to obtain corrected data by combining the detected data with the theoretical state information;
determine height information of the UAV according to the corrected data; and
in response to determine that the height information of the carrier is less than a first pre-set height threshold value, trigger an obstacle avoidance warning or adjust a course trajectory of the UAV to avoid a ground collision;
wherein the invalid data comprises observation state information of a non-ground target, the non-ground target is a detection target having an elapsed time of less than a second pre-set threshold value, and the elapsed time is a time required for the carrier to pass the detection target.

16. The UAV according to claim 15, wherein the flight controller is further configured to:
iterate a plurality of Kalman filtering processes based on the observation state information and the theoretical state information; and
output state information estimate of the detection target after each Kalman filtering process as the corrected data.

17. The UAV according to claim 16, wherein the Kalman filtering process comprises:
calculating a prior estimate value of the theoretical state information through a preset first transformation relation based on the state information estimate obtained from a previous Kalman filtering process;
calculating a current state vector estimation error covariance matrix based on a state vector estimation error covariance matrix obtained from the previous Kalman filtering processing;
calculating a residual between the prior estimate value and the observation state information according to a pre-set second transformation relation;
calculating a Kalman gain coefficient according to the current state vector estimation error covariance matrix, the prior estimate value, and the observation state information;
updating the current state vector estimation error covariance matrix according to the Kalman gain coefficient; and
weighting and superimposing the residual and the prior estimate value with the Kalman gain coefficient as a weighting coefficient to obtain the state information estimate.

18. The UAV according to claim 15, wherein the flight controller is further configured to:
determine a tilt angle of the radar according to posture information of the UAV;
determine whether there is a detection target within a search range in the corrected data, the search range being formed by floating up and down an allowable error based on the tilt angle;
in response to determining that there is a detection target within the search range, select a detection target closest to the tilt angle as a reference target within the search range;
calculate current height information of the UAV according to the observation state information of the reference target; and
in response to determining that there is no detection target within the search range, estimate the current height information of the UAV according to motion information of the UAV and previously calculated height information.

* * * * *